(12) United States Patent
Matsuki et al.

(10) Patent No.: US 7,415,955 B2
(45) Date of Patent: Aug. 26, 2008

(54) STARTING SYSTEM FOR INTERNAL COMBUSTION ENGINE

(75) Inventors: Yoshitaka Matsuki, Kanagawa (JP); Naoki Osada, Kanagawa (JP); Hidehiro Fujita, Kanagawa (JP); Masahiko Yuuya, Kanagawa (JP); Atsushi Mitsuhori, Kanagawa (JP); Tadanori Yanai, Kanagawa (JP); Takatsugu Katayama, Kanagawa (JP); Shouta Hamane, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 180 days.

(21) Appl. No.: 11/332,887

(22) Filed: Jan. 17, 2006

(65) Prior Publication Data

US 2006/0157023 A1    Jul. 20, 2006

(30) Foreign Application Priority Data

Jan. 18, 2005 (JP) ............................. 2005-010663
Jan. 18, 2005 (JP) ............................. 2005-010664

(51) Int. Cl.
*F02N 17/00* (2006.01)
*F02P 9/00* (2006.01)

(52) U.S. Cl. ............. 123/179.5; 123/179.4; 123/406.47

(58) Field of Classification Search ............. 123/179.5, 123/405.7, 179.4, 179.3, 406.47
See application file for complete search history.

(56) References Cited

U.S. PATENT DOCUMENTS

| | | | | |
|---|---|---|---|---|
| 6,098,585 | A * | 8/2000 | Brehob et al. ............. | 123/179.4 |
| 6,260,535 | B1 | 7/2001 | Froeschl et al. | |
| 6,499,342 | B1 * | 12/2002 | Gonzales, Jr. .............. | 73/117.3 |
| 6,532,926 | B1 * | 3/2003 | Kuroda et al. ............. | 123/179.4 |
| 6,817,330 | B1 * | 11/2004 | Ogawa et al. ............. | 123/179.4 |
| 7,011,063 | B2 * | 3/2006 | Condemine et al. ...... | 123/179.4 |
| 7,133,764 | B2 * | 11/2006 | Kassner .................... | 123/179.4 |
| 7,252,055 | B2 * | 8/2007 | Tani et al. ................. | 123/90.15 |
| 7,263,959 | B2 * | 9/2007 | Kataoka et al. .......... | 123/179.4 |

FOREIGN PATENT DOCUMENTS

JP        02-271073        11/1990

* cited by examiner

*Primary Examiner*—Stephen K. Cronin
*Assistant Examiner*—Arnold Castro
(74) *Attorney, Agent, or Firm*—Global IP Counselors, LLP

(57) ABSTRACT

In one aspect, an internal combustion engine includes a fuel injector for injecting fuel into a combustion chamber to produce an air-fuel mixture in the combustion chamber, a spark plug for igniting the air-fuel mixture to cause combustion in the combustion chamber and a controller controls the spark plug to cause combustion in the combustion chamber to apply a torque to start the engine from a stopped condition. The controller determines whether the operation of the engine will be stopped, and adjusts an operating condition of the engine if the controller determines the engine operation will be stopped.

19 Claims, 12 Drawing Sheets

| | ACCESSORY 2 OPERATED | ACCESSORY 2 STOP |
|---|---|---|
| ACCESSORY 1 OPERATED | CORRECTED VALUE OF REVOLUTIONS A | B |
| ACCESSORY 1 STOP | B | C |

(C < B < A)

STARTING SYSTEM FOR INTERNAL COMBUSTION ENGINE

RELATED APPLICATION

The disclosures of Japanese Patent Application No. 2005-10663, filed Jan. 18, 2005 and Japanese Patent Application No. 2005-10664, filed Jan. 18, 2005, including their specifications, claims and drawings, are incorporated herein by reference in their entireties.

TECHNICAL FIELD

Disclosed herein is a starting system for an internal combustion engine, and more particularly, a system for starting an engine through combustion in a specific cylinder without relying upon a starter having an electric motor or the like.

BACKGROUND

A so-called starterless starting system not depending upon a starter is disclosed, for example, in Japanese Laid-open Patent Application No. 02-271073. This starting system, upon starting an engine, identifies a cylinder stopped during the expansion stroke, causes combustion in the cylinder so identified, and causes revolution of the engine with this combustion as momentum, thereby starting the engine.

SUMMARY

In one aspect, an internal combustion engine includes a fuel injector for injecting fuel into a combustion chamber to produce an air-fuel mixture in the combustion chamber, a spark plug for igniting the air-fuel mixture to cause combustion in the combustion chamber and a controller controls the spark plug to cause combustion in the combustion chamber to apply a torque to start the engine from a stopped condition. The controller determines whether the operation of the engine will be stopped, and adjusts an operating condition of the engine if the controller determines the engine operation will be stopped.

BRIEF DESCRIPTION OF THE DRAWINGS

These and other features and advantages of the present system will be apparent from the following description, taken in conjunction with the accompanying drawings, in which.

DETAILED DESCRIPTION OF THE ILLUSTRATED EMBODIMENTS

Figure 1:
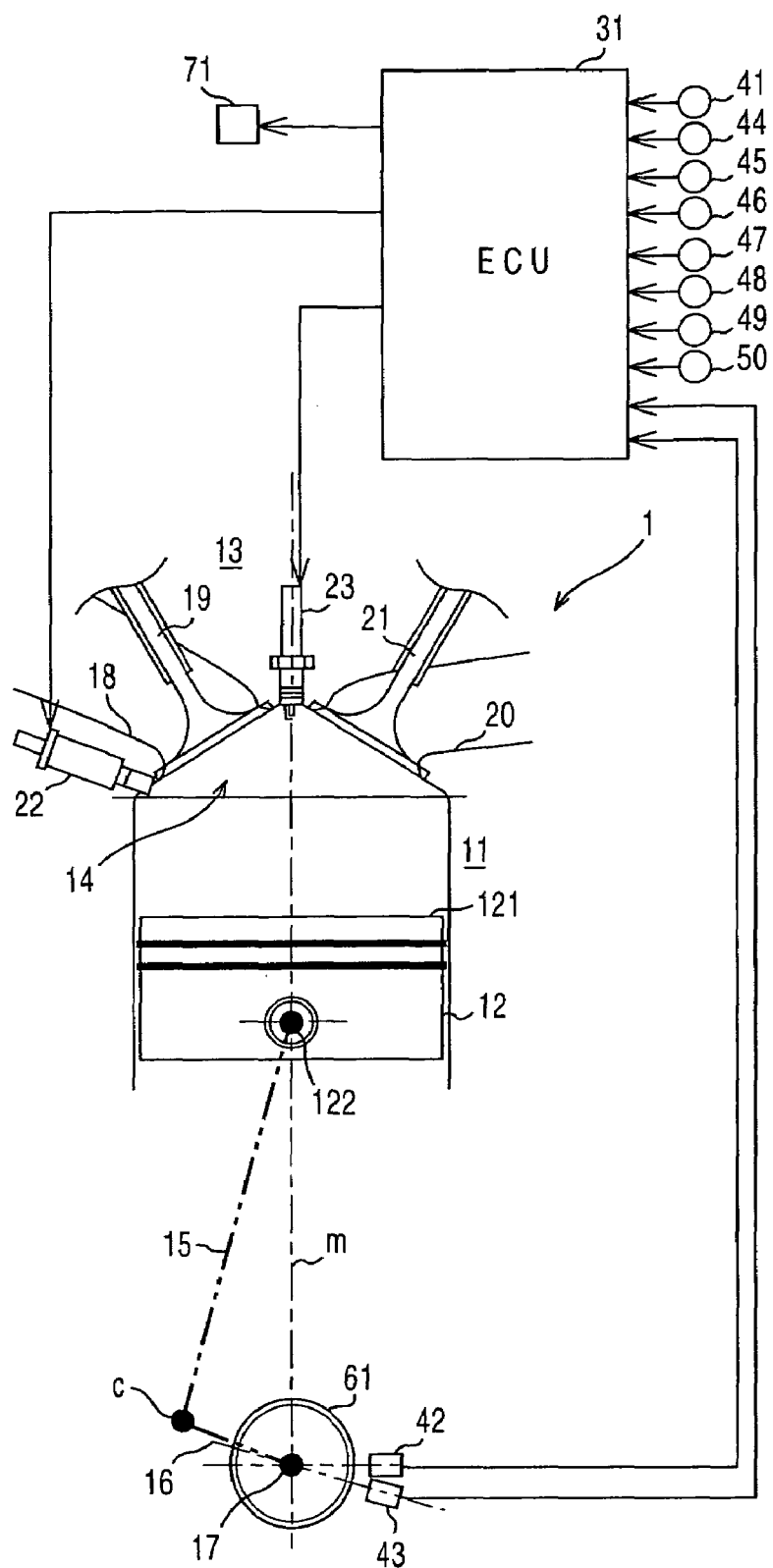
FIG. 1 is a diagrammatic representation of an internal combustion engine according to the present system.

FIG. 1 illustrates the configuration of an internal combustion engine (hereinafter referred to as "engine") 1 according to an embodiment of the system. In this embodiment, a so-called direct injection type or direct start gasoline engine is adopted as the engine 1.

A piston 12 is inserted into a cylinder block 11, and a space formed between the top surface of the piston 12 and the lower surface of a cylinder head 13 serves as a combustion chamber 14. The piston 12 is connected to a crank shaft 17 via a rod 15 and a crank arm 16, and the crankshaft 17 rotates in linkage with reciprocation of the piston 12. In this embodiment, the center 122 of the piston boss is set on the cylinder center axis m. The center 122 of the piston boss may be set in an offset position where the connecting portion c of the rod 15 and the crank arm 16 passes through this center 122 and passes on a straight line in parallel with the cylinder center axis m before top dead center.

An intake port 18 is formed on one side of the cylinder head 13 with reference to the cylinder center axis m, and the intake port 18 is connected to an inlet manifold (not shown) and forms an intake path. The intake port 18 is opened and closed by means of an inlet valve 19. An exhaust port 20 is formed on the other side relative to the cylinder center axis m. The exhaust port 20 is connected to an exhaust manifold (not shown), to form an exhaust path. The exhaust port 20 is opened and closed by means of an exhaust valve 21. Two intake ports 18 and two exhaust ports 20 are provided in parallel in each cylinder. The inlet valve 19 and the exhaust valve 21 are driven by an intake cam and an exhaust cam (not shown), respectively, provided above these valves 19 and 21. In this embodiment, an inlet control valve 71 is provided for controlling the number of idling revolutions as described below. The inlet control valve 71 is installed in a bypass path which bypasses a throttle valve (not shown; provided in the intake path). When the throttle valve is of the solenoid type, it may function as an inlet control valve 71.

An injector 22 for supplying fuel is provided on the cylinder head 13 and facing the combustion chamber 14. Fuel is injected directly into the combustion chamber 14 via this injector 22. In this embodiment, the injector 22 is disposed between the two intake ports 18, 18 so that fuel is injected sideways into the combustion chamber 14. A spark plug 23 for igniting fuel so injected is provided on the cylinder center axis m. Operation of the injector 22 and the spark plug 23 is controlled by an engine control unit 31 is described below.

The engine 1 is integrally controlled by an engine control unit (hereinafter called "ECU") 31. Entered into ECU 31 are signals from an accelerator sensor 41, which detects the acceleration opening, signals from crank angle sensors 42 to 44 (the number of engine revolutions can be calculated on the basis thereof), and signals from a temperature sensor 45 that detects coolant temperature, and also entered into ECU 31 are signals from an operating switch 46 of a power steering device, an operating switch 47 of an air conditioner, an operating switch 48 of an alternator, an ignition switch 49, and a start switch 50. On the basis of these signals, ECU 31 calculates and sets an amount of injection and injecting timing of the fuel injection valve 22 and ignition timing of the ignition device 23.

When prescribed idling stop conditions predetermined in accordance with speed and the like are met, the ECU 31 conducts idling stop control, which temporarily stops the engine 1 for a period therefrom until the idling stop canceling conditions are met. In this embodiment, three crank angle sensors 42 to 44 are installed to detect accurately the stop position of the crankshaft 17 upon idling stop. From among them, two sensors 42 and 43 are provided for a first rotor 61 attached to the crankshaft 17. Surface irregularities are formed at intervals of 30 degrees on the outer periphery of this first rotor. The sensors 42 and 43 generate position signals at intervals of 30 degrees of crank angle in accordance with these surface irregularities. The sensors 42 and 43 are arranged with a gap of 15 degrees in the circumferential direction around the crankshaft 17, and generate these position signals by shifting the phase by 15 degrees. The remaining sensor 44 is provided relative to a second rotor (not shown) attached to the cam shaft. The second rotor has a projection formed on the outer periphery thereof, and generates a reference signal for each crank angle of 720 degrees. These crank angle sensors 42 to 44 enable detection of the stop position of the crankshaft 17 with an accuracy of 15 degrees. Upon restarting after idling stop, the ECU 31 identifies a cylinder having stopped during the expansion stroke upon idling stop on the basis of the detected stop position, causes combustion in the cylinder so identified, and causes rotation of the engine 1 with this combustion as a momentum, thereby starting the engine. The number of revolutions of the engine can be detected by counting position signals from the sensors 42 and 43 for a prescribed period of time, or by measuring the occurring cycle of reference signals from the sensor 44.

Figure 2:
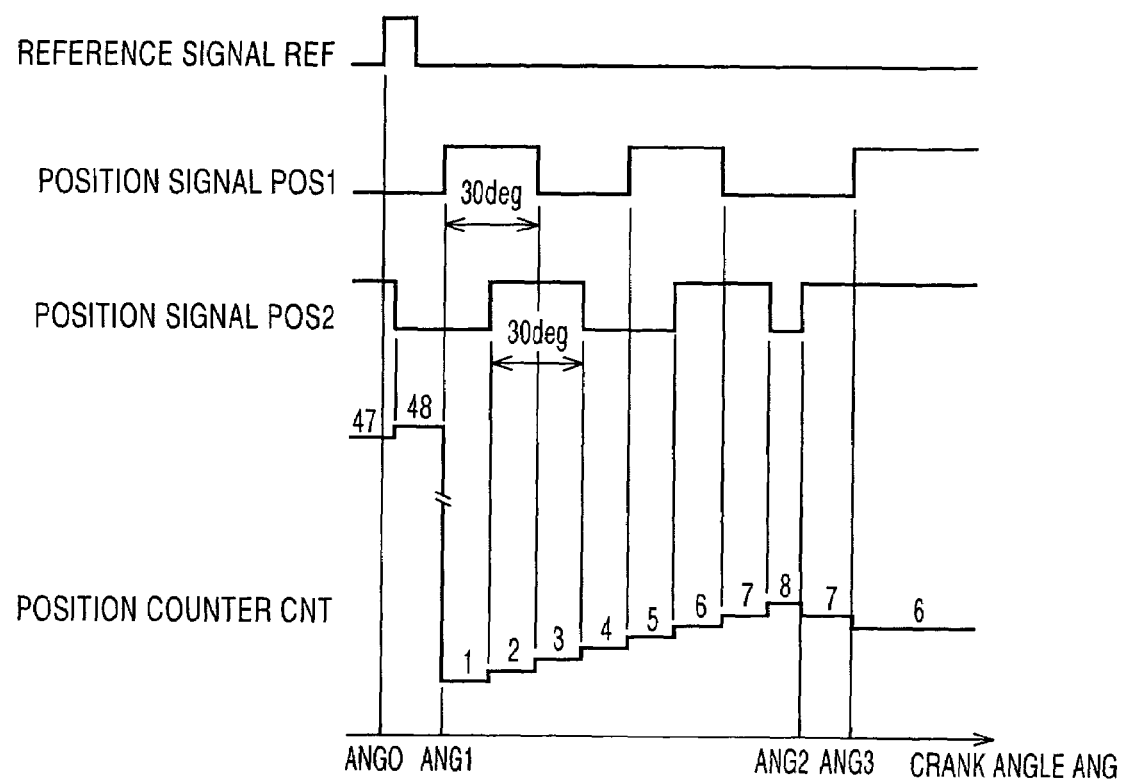
FIG. 2 is a graph showing changes in a position counter relative to output from a crank angle sensor.

Detection of the stop position of the crank shaft by the crank angle sensors 42 to 44 will now be described with reference to FIG. 2, which illustrates output waveforms of the crank angle sensors 42 to 44 during stoppage of the engine 1.

A position counter CNT taking values 1 to 48 is set in the ECU 31. The ECU 31 detects a stop position of the crankshaft 17 from the value of this position counter CNT during stoppage. As described above, position signals POS1 and POS2 from the sensors 42 and 43 are entered every 30 degrees with a phase gap of 15 degrees. The position counter CNT is reset to 1 by entering a position signal (POS1 in this case) next to the input of the reference signal REF (angle ANG1), and 1 is added upon every input of position signal POS1 or POS2. When the position signals POS1 and POS2 from the sensors 42 and 43 are alternately entered, 1 is added upon input of any of the position signals POS1 and POS2. When the crankshaft 17 rotates reversely immediately prior to complete stoppage of rotation upon stoppage of the engine 1, position signals (POS2 in this case) from one of the sensors would be entered in succession (angle ANG2). In this case, a stop position taking into account the reverse rotation can be detected by subtracting 1 from the position counter CNT. Whether or not rotation has completely been discontinued can be determined from the absence of input of any of the position signals POS1 and POS2 for a prescribed period of time (angle ANG3).

Operation of the ECU 31 will now be described with reference to FIG. 3, which is a flowchart of the idling control process. This process is activated by turning on an ignition switch 49 and executed thereafter in a prescribed cycle. Idling revolution control of the engine 1, idling stop, and restart after idling stop are performed in accordance with this process.

At step S101, it is determined whether or not prescribed conditions have been met. When the conditions have been met, the process advances to step S102, and if not, this process is reset. In this embodiment, the process shifts to the next idling revolution control on condition that: a) the acceleration opening is lower than a prescribed value, and the acceleration pedal is in a completely reset state, and b-1) the engine is operating at a low speed at which the speed is lower than a prescribed value, or b-2) the shift lever of the transmission is in the neutral position. The speed cn be calculated on the basis of the engine revolutions, the gear ratio of the transmission, or the like.

At step S102, idling revolution control is performed. This control may be accomplished by any of the publicly known methods. In this embodiment, a target idling revolution tNid1 is set on the basis of the cooling water temperature, the load caused by the accessories, the position of the shift lever, and the like, and idling revolutions are controlled to a target number of idling revolutions tNid1 by setting an actual number of engine revolutions NE through control of the intake air. More specifically, the difference between the target number of idling revolutions tNid1 and the number of engine revolutions is calculated, and the number of engine revolutions NE is brought into agreement with the target number of idling revolutions tNid1 by opening and closing the intake control valve 71 on the basis of the thus calculated difference.

At step S103, it is determined whether or not the prescribed idling stop conditions have been met. If so, the process advances to step S104, and if not, the process is reset. In this embodiment, idling stop is performed on condition that: a) a substantial stop state with a speed lower than a prescribed value continues to exist for a prescribed period of time, and b) the coolant or cooling water temperature is lower than a prescribed value.

Figure 4:
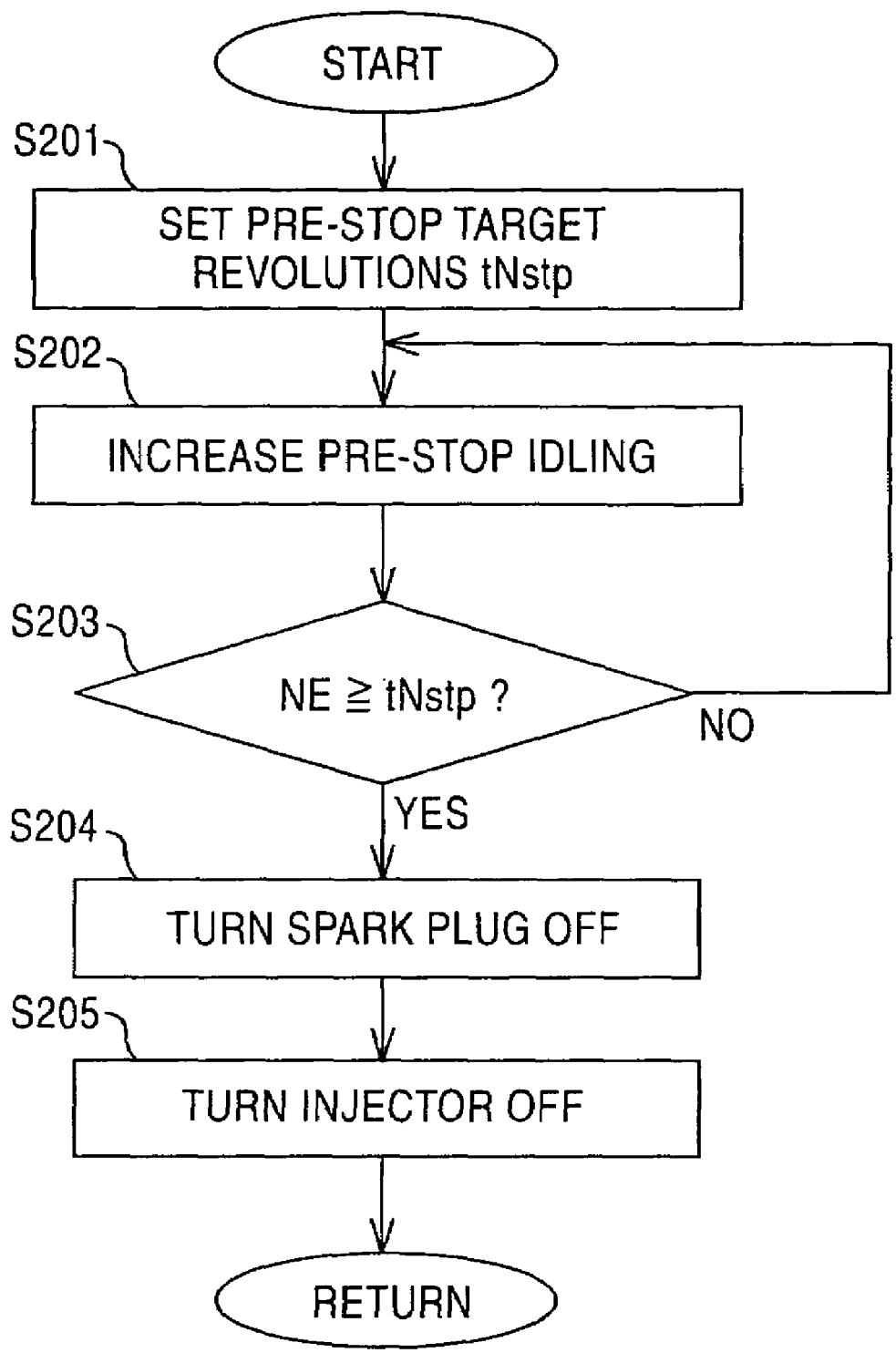
FIG. 4 is a flowchart of a stop control process of the first embodiment.

At step S104, stop control is executed in compliance with the flowchart shown in FIG. 4.

At step S105, it is determined whether or not prescribed idling stop canceling conditions have been met. If so, the process advances to step S106. If not, the processing at this step S105 is repeated. In this embodiment, an acceleration opening greater than a prescribed value is detected by the acceleration sensor 41, and idling stop is cancelled on condition that the acceleration pedal is determined to have been depressed.

At step S106, there is identified a cylinder having stopped during the expansion stroke upon idling stop on the basis of the stop position of the crankshaft 17. Fuel injection and ignition are executed for this cylinder to cause combustion and start the engine 1.

FIG. 4 is a flowchart of the stop control process.

Figures 5, 6:
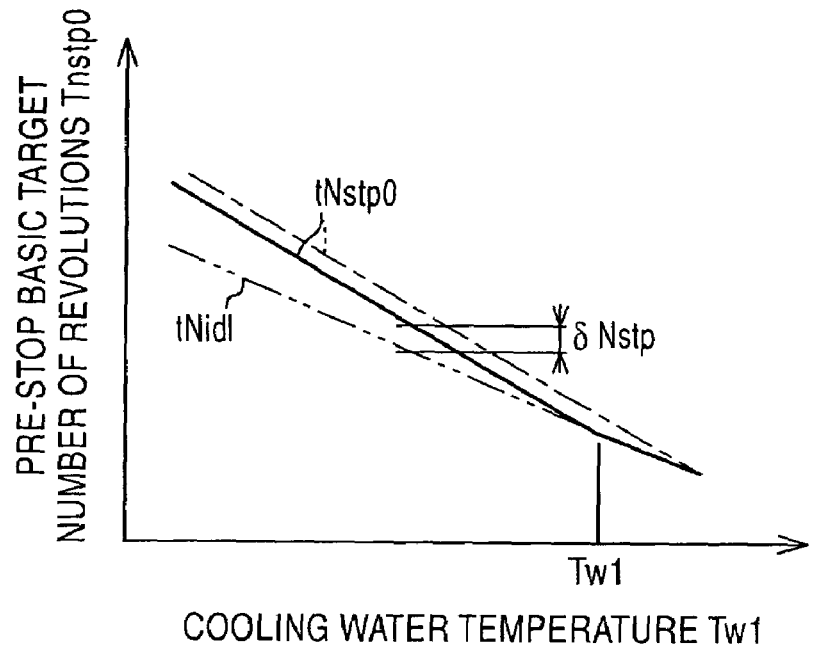
FIG. 5 is a graph of pre-stop basic target number of revolutions versus cooling water temperature.
FIG. 6 is a table of correction value of the pre-stop target number of revolutions relative to the load caused by accessories.

At step S201, the number of engine revolutions is increased prior to idling stop. In this embodiment, a pre-stop target number of revolutions tNstp larger than the target number of idling revolutions tNid1 before satisfaction of idling stop conditions is set as a target number of engine revolutions. The number of engine revolutions is increased by controlling the number of engine revolutions so as to achieve agreement with the above. A pre-stop target number of revolutions tNstp is set by adding a correction value DLT retrieved from a table as shown in FIG. 6 to the pre-stop basic target number of revolutions tNstp0 retrieved from a curve showing the tendency represented in FIG. 5 (tNstp=tNstp0+DLT). In the graph shown in FIG. 5, the pre-stop basic target number of revolutions tNsstp0 is generally set at a value larger than the target number of idling revolutions tNid1, and it is set so that the difference δNstp from the target number of idling revolutions tNid1 becomes larger accordingly as the cooling water temperature Tw is lower. In this embodiment, both numbers of revolutions tNstp0 and tNid1 are brought into agreement when the cooling water temperature Tw is larger than a prescribed value Tw1. The pre-stop basic target number of revolutions tNstp0 may be set at a value larger than the target number of idling revolutions tNid1 over the entire range of possible values of cooling water temperature. On the other hand, the correction value DLT in the table shown in FIG. 6 is set in response to the load caused by accessories. In this embodiment, a power steering device and an alternator are adopted as the accessories. The correction value DLT is set at a relatively large value A when both accessories are determined to be operating, to judge from signals from the switches 46 and 48. When accessories or any one of them is determined to be operating, it is set at a value B smaller than this value A. If both accessories are judged to be in stoppage, it is set at the smallest value C (C<B<A).

The correction value DLT is changed through operation or stoppage of the power steering device or the like in response to the operating status of accessories, and may be changed in accordance with the magnitude of load thereof. In this case, a sensor for detecting the load caused by accessories is installed in addition to the switches 46 and 48. The load caused by the alternator can be detected on the basis of the power generated by the alternator. The correction value DLT may also be changed, not limited to the load caused by the alternator, in response to the load caused by the air conditioner. The load caused by the air conditioner can be calculated on the basis of the flow rate of the blower of the air conditioner.

At step S202, the number of engine revolutions is increased by driving prescribed devices. In this embodiment, the number of engine revolutions may be increased by increasing the volume of intake air through operation of the intake control valve 71, or by setting the ignition timing forward. When using the former method, the number of engine revolutions can be largely increased, and when adopting the latter method, the number of engine revolutions can be increased with a high response.

At step S203, it is determined whether or not the number of engine revolutions NE of an actual engine has reached a pre-stop target number of revolutions tNstp. If it has, the process advances to S204, and if not, processing at steps S202 and S203 is repeated.

At step S204, output of energizing signals to the ignition coil of the ignition plug 23 is shut off for idling stop, and ignition in all the cylinders is discontinued.

At step S205, output of driving signals to the solenoid of the injector 22, and fuel injection in all the cylinders is discontinued.

Figure 3:
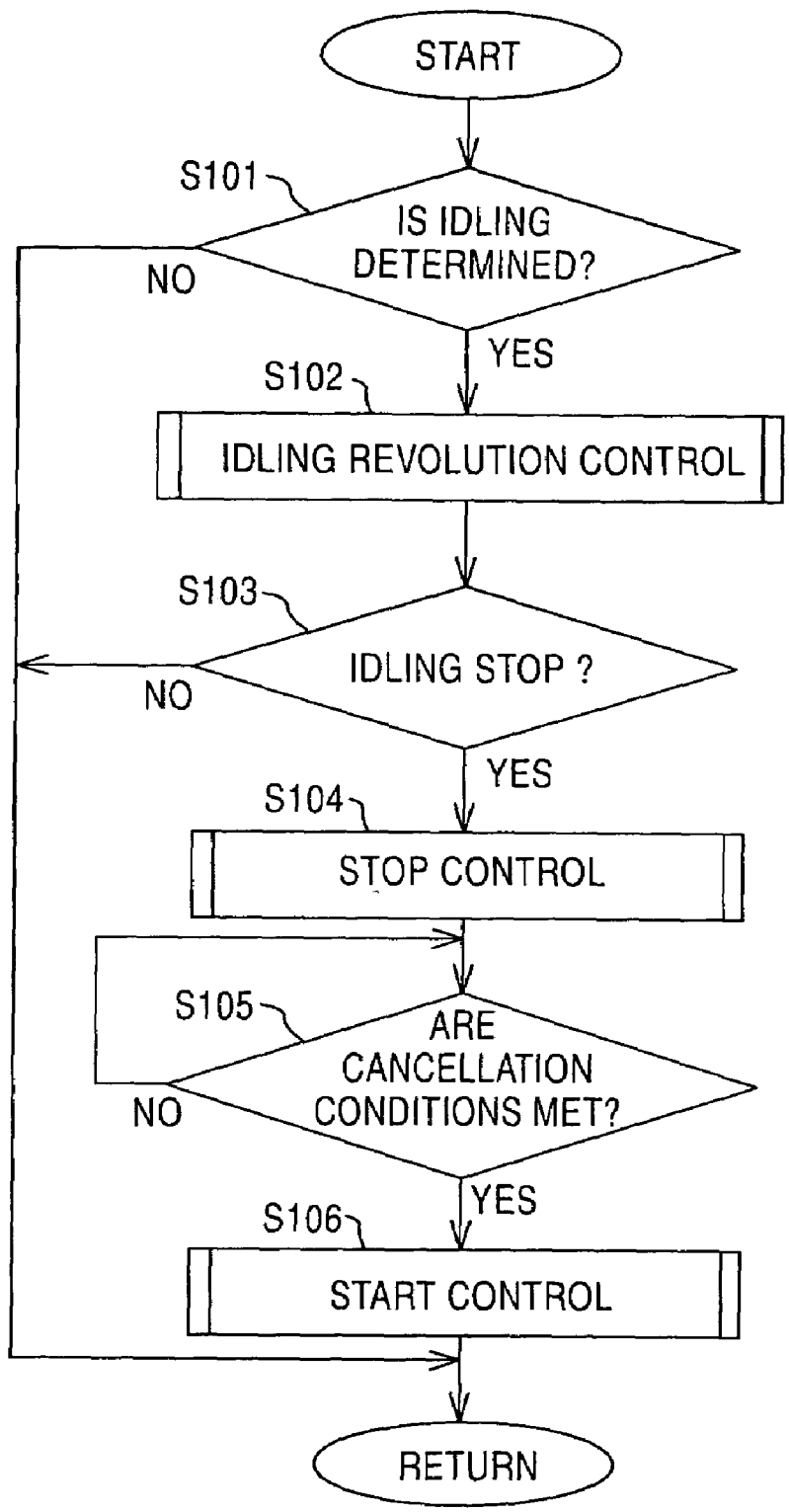
FIG. 3 is a flowchart of an idling control process of a first embodiment of the present system.

Regarding this embodiment, the processing at step S101 in the flowchart shown in FIG. 3 corresponds to the "stop determining means"; the processing at steps S201 to S203 in the flowchart shown in FIG. 4 corresponds to the "rotation control means"; the processing at step S204 in the same flowchart corresponds to the "ignition stop means"; the cooling water temperature sensor 45 corresponds to the "temperature detecting means"; and the injector 22 corresponds to the "fuel injecting means".

More specifically, a number of engine 1 revolutions can be maintained during the period before the complete stop of rotation after stoppage of ignition by increasing the number of engine revolutions and reducing the number of engine revolutions from a higher revolutions tNstp prior to idling stop in this embodiment. As a result, upon idling stop, it is possible reliably to cause the engine 1 to rotate by a number of revolutions necessary for scavenging of combustion gas, and to accomplish this scavenging sufficiently in all the cylinders. Upon the next starting, combustion can be caused satisfactorily to start the engine promptly.

Figure 7:
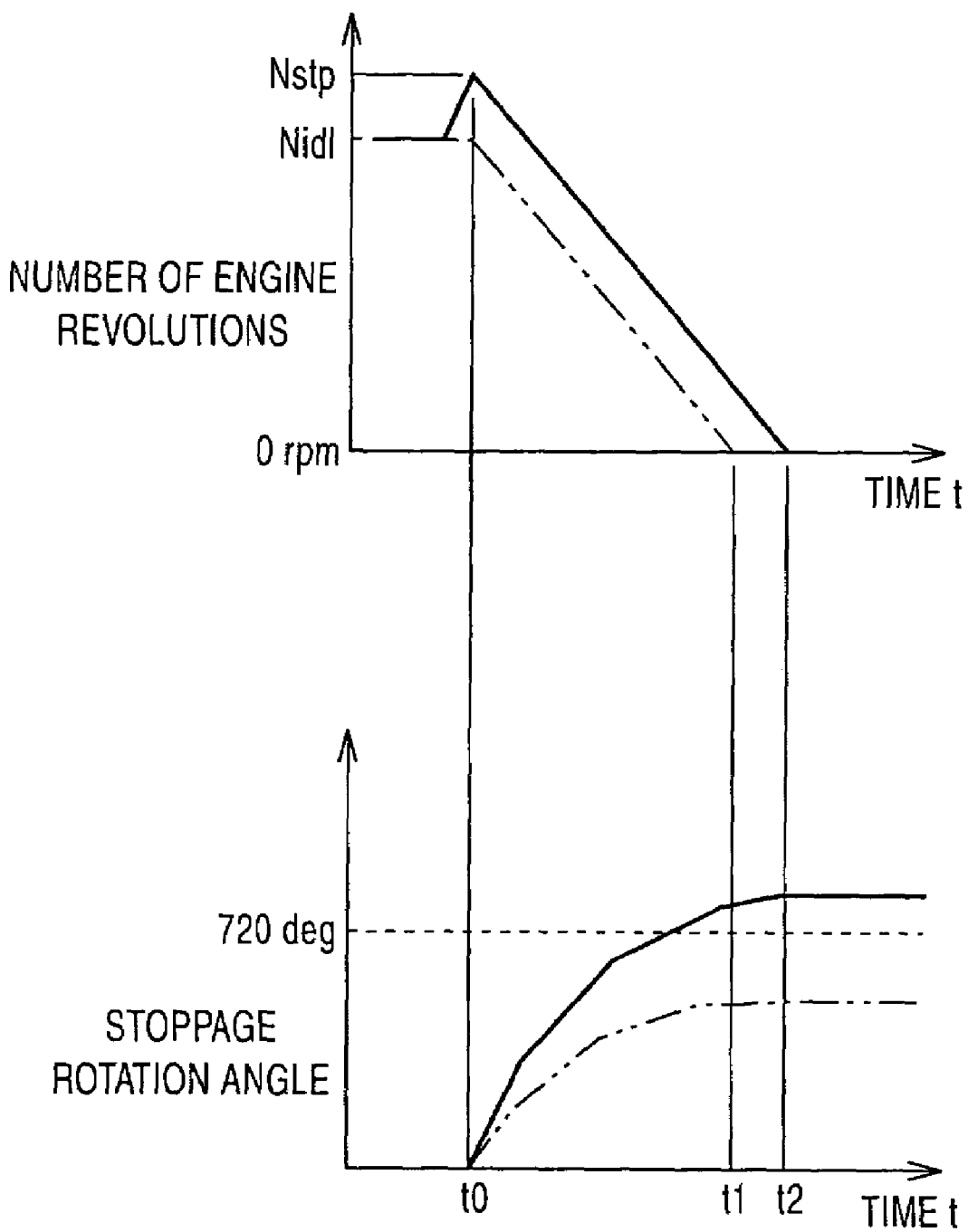
FIG. 7 is a graphic illustration of the effect of increasing the number of engine revolutions prior to idling stop.

FIG. 7 illustrates the advantages available. In FIG. 7, where the number of engine revolutions is increased prior to idling stop is represented by a solid line, and where a usual target number of idling revolutions tNid1 is maintained, by a two-point interrupted line. The inclination upon decrease in the number of engine revolutions after stop of ignition shows no marked difference between the two cases. By increasing the number of engine revolutions, therefore, it is possible to extend the period between stoppage of ignition (time t0) to complete stop of rotation, and thus to ensure a sufficient angle of rotation (referred to as "stop rotation angle") of the crankshaft 17. FIG. 7 shows that during the period after stoppage of ignition to complete stoppage of rotation, the engine 1 can be caused to rotate by more than 720 degrees, and the crankshaft 17 can be rotated by more than two turns by increasing the number of engine revolutions to the pre-stop target number of revolutions tNstp.

In this embodiment, a stop rotation angle can be ensured without depending upon environmental or other conditions by setting the pre-stop target number of revolutions tNstp on the basis of the coolant or cooling water temperature Tw and the load caused by accessories. In other words, it is possible to cope with an increase in friction caused by a change in environment and to maintain a stop rotation angle by detecting the cooling water temperature Tw and executing idling stop at a number of engine revolutions Nstp largely increased from the target number of idling revolutions tNid1 accordingly as the cooling water temperature is lower (FIG. 5). On the other hand, a stop rotation angle can be maintained without relying upon the load caused by accessories by detecting the load caused by the accessories and executing idling stop at a number of engine revolutions Nstp largely increased from the target number of idling revolutions tNid1 accordingly as the detected load is higher (FIG. 6). In order to alleviate the effect of environment or the like, the lubricant oil temperature or the ambient temperature may be adopted in place of the cooling water temperature Tw. In this case, a tendency similar to that shown in FIG. 5 can be imparted to the pre-stop basic target number of revolutions tNstp0.

In this embodiment, upon increasing the number of engine revolutions, the target number of revolutions after increase (i.e., pre-stop target number of revolutions tNstp) itself is set on the basis of the cooling water temperature Tw. Apart from this, an increment δNstp from the target number of idling revolutions tNid1 may be calculated to add the result to the target number of idling revolutions tNid1.

Figure 8:
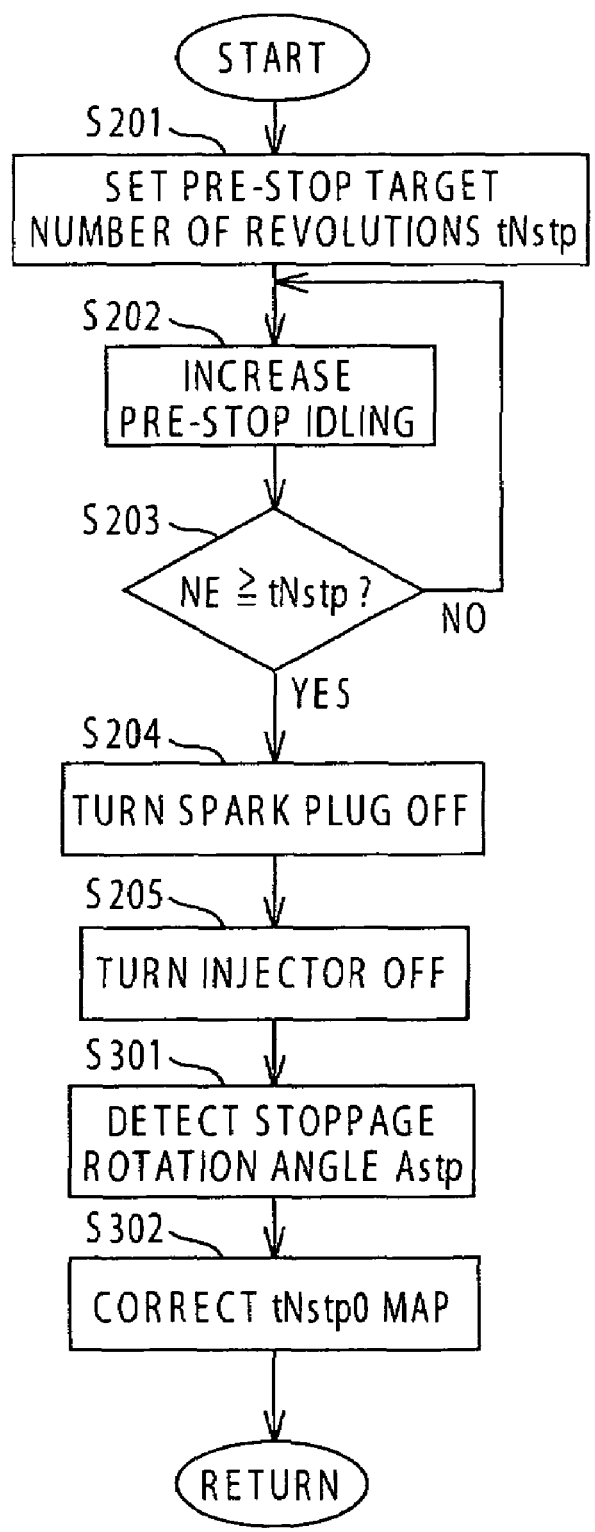
FIG. 8 is a flowchart of a stop control process of a second embodiment of the present system.

FIG. 8 is a flowchart of the stop control process of a second embodiment. The engine configuration is the same as that shown in FIG. 1.

The ECU 31 executes stop control upon satisfaction of prescribed idling stop conditions after determination of idling.

Prior to idling stop, a pre-stop basic target number of revolutions tNstp0 and a correction value DLT are calculated with reference to the tendencies illustrated in FIGS. 5 and 6, and a pre-stop target number of revolutions tNstp is set (tNstp=tNstp0+DLT:S201). The intake control valve 71 and other prescribed devices are driven (S202) on the basis of the thus-set pre-stop target number of revolutions tNstp. When the number of engine revolutions has reached the pre-stop target number of revolutions tNstp (S203), the spark plug 23 is deenergized (S204), and the injector 22 is stopped (S205).

At step S301, the angle A of rotation of the engine 1 during the period from stoppage of ignition (i.e., combustion) to complete stoppage of revolutions can be easily detected on the basis of output of the crank angle sensors 42 to 44.

Figure 9:
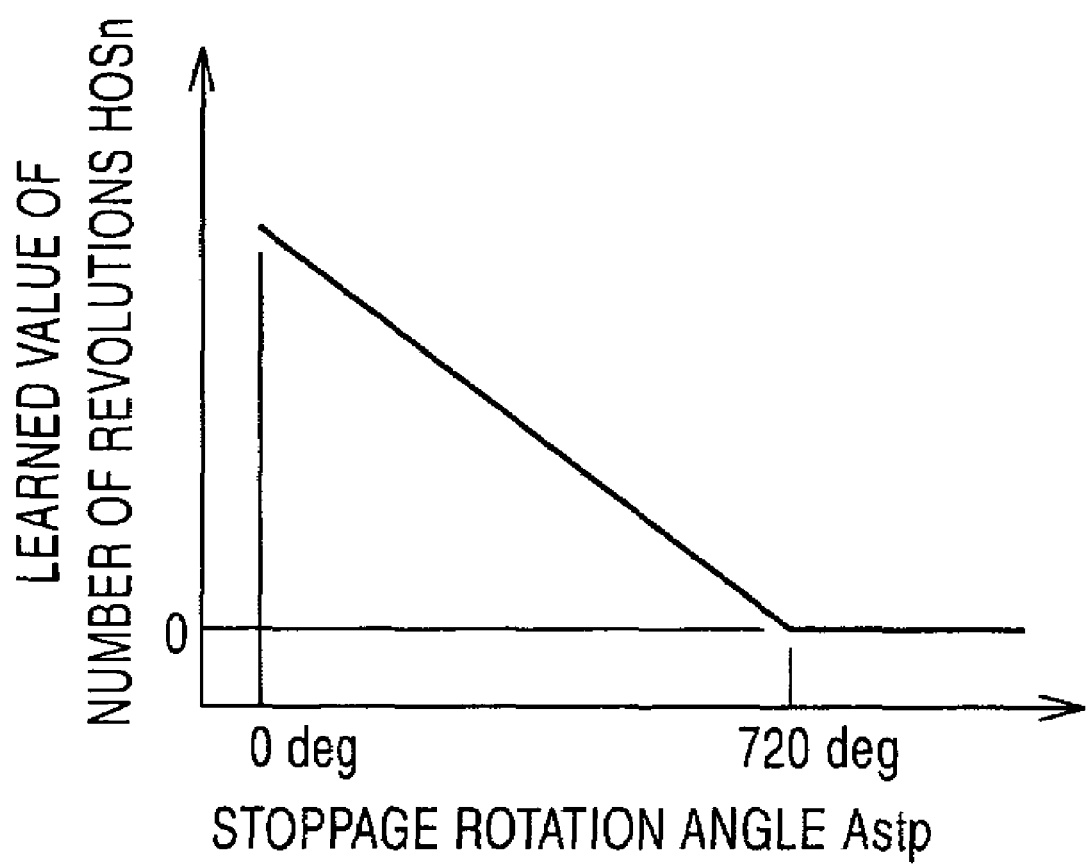
FIG. 9 is a graph of learning value of the pre-stop target number of revolutions versus stoppage rotation angle.

At step S302, the pre-stop basic target number of revolutions tNstp0 is corrected on the basis of the detected stop rotation angle Astp. In this embodiment, a learning value HOSn is calculated from a tendency graph shown in FIG. 9, and the thus-calculated result is added to the pre-stop basic target number of revolutions tNstp0 from the graph (FIG. 5). In the graph shown in FIG. 9, the learning value HOSn is set at a smaller value according as the stop rotation angle Astp is larger. It is set at 0 for a stop rotation angle Astp over 720 degrees. This is because a stop rotation angle necessary for causing scavenging in all the cylinders is ensured. Correction of the pre-stop basic target number of revolutions tNstp0 by means of this learning value HOSn should preferably be performed for each region of the cooling water temperature Tw. In FIG. 5, the pre-stop basic target number of revolutions tNsstp0 after correction is represented by a one-point interrupted line. Upon the next idling stop, the correction of the pre-stop basic target number of revolutions tNstp0 is reflected in setting (S201) of the pre-stop target number of revolutions tNstp.

Regarding this embodiment, among others, step S301 in the flowchart shown in FIG. 8 corresponds to the "stop rotation angle detecting means"; and the processing at step S201 to 203 and 302 in this flowchart corresponds to the "rotation control means".

According to this embodiment, upon idling stop, it is determined whether or not scavenging of combustion gas has sufficiently been conducted in all the cylinders on the basis of the stop rotation angle Astp. If it is not sufficient, the increase in the pre-stop basic target number of revolutions tNstp0 makes it possible, in the next idling stop, to carry out idling stop at a higher number of engine revolutions Nstp and thus to ensure a sufficient stop rotation angle. As a result, it is possible to reliably carry out scavenging upon idling stop and to maintain startability of the engine 1.

Figure 10:
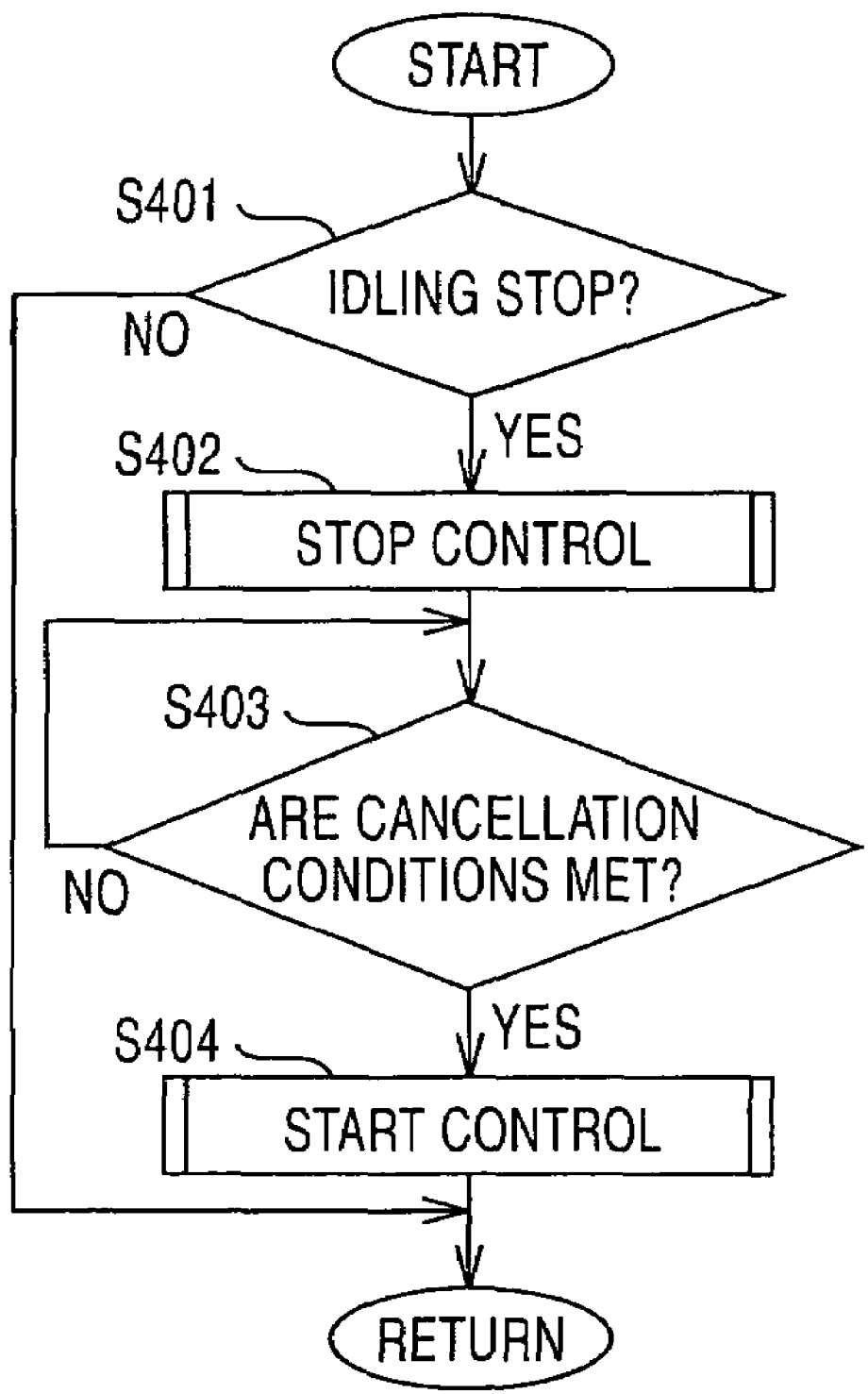
FIG. 10 is a flowchart of an idling stop control process of a third embodiment of the present system.

FIG. 10 is a flowchart of the idling stop control process according to a third embodiment. This process is activated by turning the ignition switch 49 on, and subsequently operated at a prescribed period.

At step S401, it is determined whether or not prescribed idling stop conditions are satisfied. When they are, the process advances to step S402. If not, the process is returned to step S401. In this embodiment, idling stop is executed on condition that: a) the acceleration opening is smaller than a prescribed value, and the acceleration pedal is in a completely reset state; b) a substantial stop state at a speed lower than a prescribed value continues for a prescribed period of time; and c) the coolant or cooling water temperature is lower than a prescribed value. The speed can be calculated on the basis of the number of engine revolutions, the gear ratio of the transmission, or the like.

Figure 11:
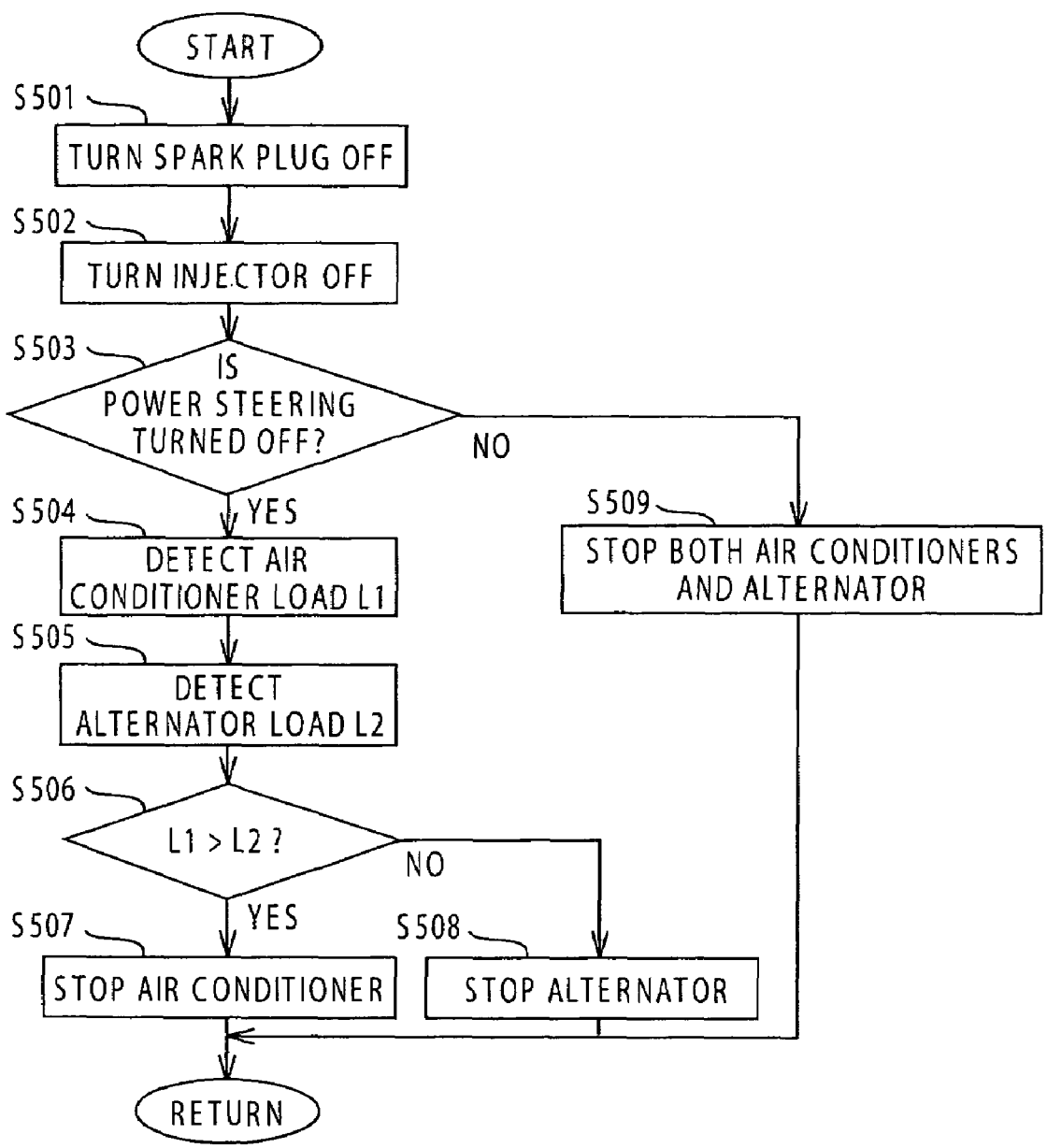
FIG. 11 is a flowchart of a stop control process of the third embodiment.

At step S402, stop control is executed in accordance with the flowchart shown in FIG. 11.

At step S403, it is determined whether or not prescribed idling stop cancellation conditions are satisfied. When these cancellation conditions are satisfied, the process advances to step S404. When they are not satisfied, the processing of this step S403 is repeated. In this embodiment, on condition that an acceleration opening larger than a prescribed value is detected by the acceleration sensor 41, and the acceleration pedal is determined to have been depressed, idling stop is cancelled.

At step S404, a cylinder having stopped during the expansion stroke during idling stop is identified on the basis of the stop position of the crankshaft 17, and combustion is caused by executing fuel injection and ignition for the cylinder so identified, thereby starting the engine 1.

FIG. 11 is a flowchart of the stop control process.

At step S501, output of the energizing signal to the ignition coil of the spark plug 23 is shut off, and ignition is stopped in all the cylinders.

At step S502, output of the driving signal to the solenoid of the injector 22 is shut off, and fuel injection is stopped in all the cylinders.

At step S503, the operating switch 46 of the power steering device is turned off, and it is determined whether or not this device is in stoppage. When in stoppage, the process advances to step S504, and if in operation, to step S509. The operating switch 46 is turned off if the steering wheel is in a state within a prescribed range relative to the neutral position, and turned on in a state in which the wheel is turned by more than a prescribed angle to the left or right from the neutral position.

At step S504, a load L1 of the air conditioner is detected on the basis of a signal from the load sensor 47. This load L1 can be calculated from the flow rate of the blower of the air conditioner.

At step S505, a load L2 of the alternator is detected in compliance with a signal from the load sensor 48. This load L2 can be calculated on the basis of the power generated by the alternator.

At step S506, it is determined whether or not the load L1 of the air conditioner is larger than the load L2 of the alternator. If larger, the process advances to step S207, or if otherwise, advances to step S208.

At step S507, the air conditioner is stopped.

At step S508, the alternator is stopped.

At step S509, the power steering device is determined to apply a large load on the engine 1, and both the air conditioner and the alternator are stopped.

Regarding this embodiment, the power steering device corresponds to the "first accessory"; the air conditioner corresponds to the "second accessory"; and the alternator corresponds to the "third accessory". The processing at step S501 of the flowchart shown in FIG. 11 corresponds to the "ignition stopping means"; and the processing at steps S507 and S509 of the flowchart corresponds to the "load reducing means".

In this embodiment, it is possible to ensure a number of revolutions of engine 1 during the period after stoppage of ignition to complete stoppage of rotation by stopping, upon idling stop, the accessories such as the air conditioner to reduce the load on the engine 1. As a result, sufficient scavenging can be accomplished in all the cylinders by reliably rotating the engine 1 by a number of revolutions necessary for scavenging of combustion gas, and upon the next starting, satisfactory combustion can be caused and the engine can be started promptly.

Figure 12:
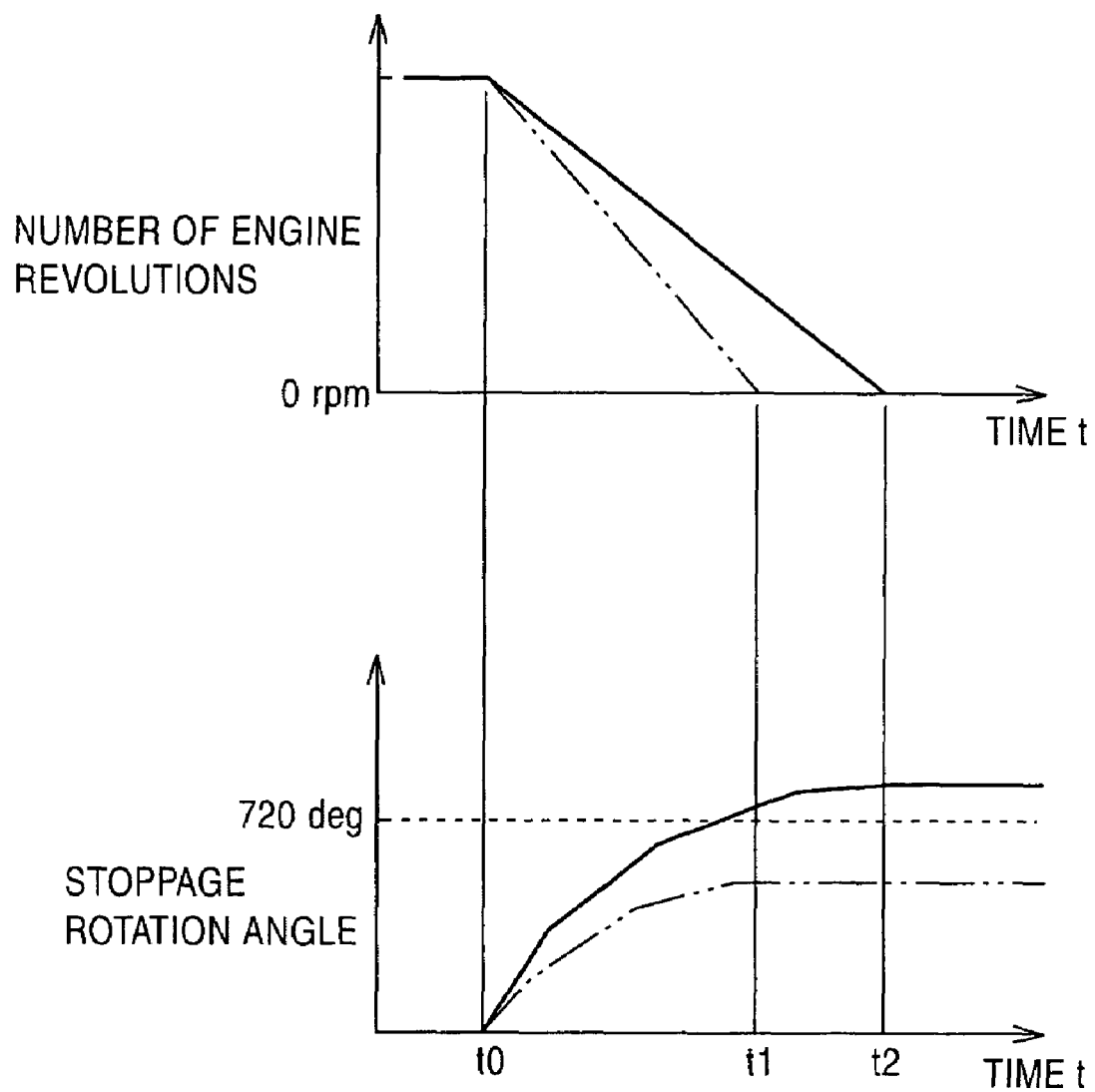
FIG. 12 is a graphic illustration of the effect of reducing the load upon idling stop.

FIG. 12 illustrates these advantages. Where the load caused by accessories along with stoppage of ignition is reduced is represented by a solid line, and where operation of the accessories is maintained even after stoppage of ignition is represented by a two-point interrupted line. Reduction of the load caused by accessories leads to a slower decrease in the number of engine revolutions after stoppage of ignition (time t0), thereby permitting maintenance of a sufficient rotation angle of the crankshaft 17 before complete stoppage of rotation. FIG. 12 shows the possibility of causing rotation of the engine 1 by a crank angle of more than 720 degrees and ensuring more than two turns of the crankshaft 17.

In this embodiment, the accessory for reducing the load is switched over upon idling stop in response to an operating status of the power steering device that is causing a relatively large load. That is, when the power steering device stops, one of the air conditioner and the alternator, causing a larger load, is stopped, and on the other hand, when the power steering device is in operation, both the air conditioner and the alternator are stopped, thereby enabling both the function of starting of the engine 1 and the accessory function of the air conditioner.

Figure 13:
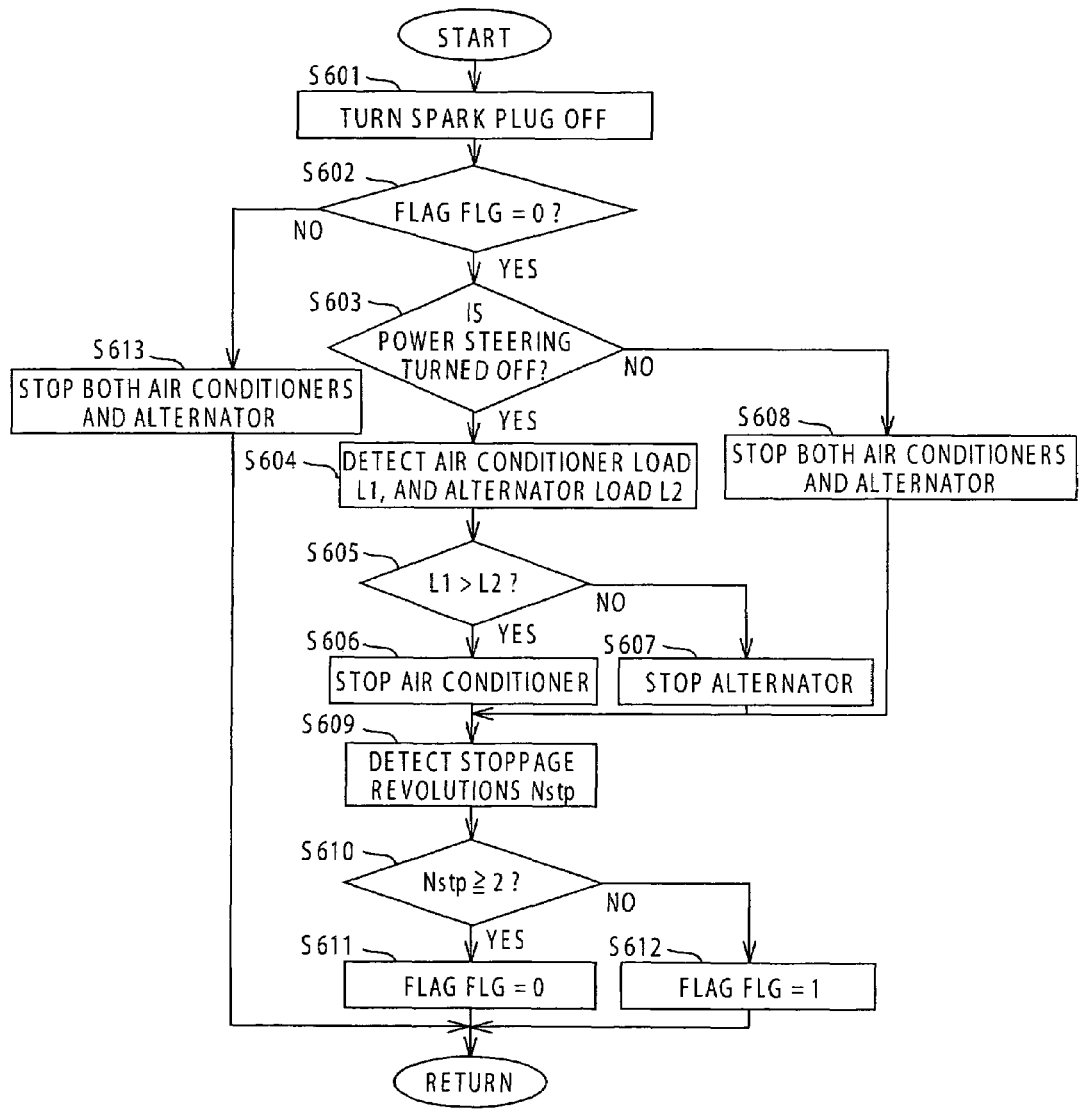
FIG. 13 is a flowchart of a stop control process of a fourth embodiment of the present system.

FIG. 13 is a flowchart of the stop control process of a fourth embodiment. The engine configuration in this embodiment is the same as that in the embodiment shown in FIG. 1.

The ECU 31 executes this top control upon satisfaction of prescribed idling stop conditions.

Upon idling stop, ignition is stopped for all the cylinders (step S601). Then at step S602, it is determined whether or not the scavenging determining flag FLG, described below, is 0. When it is 0, the process advances to step S603, and when otherwise, advances to step S613. It is determined whether or not the power steering device is stopped (S603). If stopped, loads L1 and L2 of the air conditioner and the alternator are detected (S604). The detected loads L1 and L2 are compared (S605), and the one with a larger load is stopped (S606 and S607). When the power steering device is in operation, both the air conditioner and the alternator are stopped (S608).

After reducing the load caused by the accessories, the number of stop revolutions Nstp of the engine 1 rotating during the period from stoppage of ignition (i.e., combustion) to complete stoppage of rotation is detected at step S609. This number of stop revolutions Nstp can easily be detected from output of the crank angle sensors 42 to 44. At step S310, it is determined whether or not the number of stop revolutions Nstp is larger than 2. If larger, the process advances to S611, and if less than 2, it advances to step S612. At step S611, all the cylinders undergo at least one exhaust stroke after stoppage of ignition, and on the assumption of sufficient scavenging of combustion gas, the scavenging determining flag FLG is set to 0. At step S612, insufficient scavenging is assumed, and the scavenging determining flag FLG is set at 1. The value of the flag FLG so set is recorded in the storage of the ECU 31, and upon the next and subsequent idling stop, it is read out at step S602. At step S613, it is assumed that sufficient scavenging may not be conducted upon idling stop, and both the air conditioner and the alternator are stopped irrespective of the operating status of the power steering device.

Regarding this embodiment, the processing at step S601 of the flowchart shown in FIG. 13 corresponds to the "ignition stopping means"; and the processing at steps S606 to 608 and 613 in the same flowchart corresponds to the "load reducing means". The processing S609 of the same flowchart corresponds to the "number of stop revolutions detecting means".

According to this embodiment, upon idling stop, it is determined whether or not scavenging of combustion gas is sufficiently conducted on the basis of the number of stop revolutions Nstp. If scavenging may not be conducted sufficiently, a necessary number of stop revolutions can be ensured by reducing the load caused by accessories to the maximum. As a result, it is possible to reliably carry out scavenging upon idling stop, not depending upon increase in secular friction in the engine 1, thus permitting maintenance of the starting ability of the engine 1.

In the above-described embodiments, the engine 1 has always been started through combustion taking place in a specific cylinder. In order to ensure ability to start when the engine 1 is at a low temperature, an electrically operated start motor may be installed, and when the coolant cooling water temperature is lower than a prescribed temperature upon restart, the engine 1 may be cranked by this start motor to start.

In the embodiments described above, the description has covered restart after idling stop. However, the present system is applicable to starting after stoppage of the engine 1 caused by turning off the ignition switch.

In the above-described embodiments, a direct injection type engine 1 has been presented. However, the present system is applicable to engines in which a fuel-supplying injector is installed to face the intake path and a mixture of fuel and air, mixed prior to intake, is used. In this case, the engine 1 is stopped in a state in which the cylinders are filled with the mixture by stopping only the ignition and continuing injection of fuel Thus, while the present system has been described in connection with certain specific embodiments thereof, this is by way of illustration and not of limitation, and the appended claims should be construed as broadly as the prior art will permit.

What is claimed is:

1. An internal combustion engine, comprising:
    a fuel injector for injecting fuel into a combustion chamber to produce an air-fuel mixture in the combustion chamber,
    a spark plug for igniting the air-fuel mixture to cause combustion in the combustion chamber, and
    a controller configured to selectively control the spark plug to cause combustion in the combustion chamber of a cylinder having stopped during the expansion stroke when the engine was last stopped to apply a torque to start the engine from a stopped condition,
    the controller being further configured to selectively determine whether the operation of the engine will be stopped and to selectively adjust an operating condition of the engine so that rotation of the engine is prolonged after combustion has been stopped if the controller determines the engine operation will be stopped.

2. An internal combustion engine comprising:
    a fuel injector for injecting fuel into a combustion chamber to produce an air-fuel mixture in the combustion chamber;
    a spark plug for igniting the air-fuel mixture to cause combustion in the combustion chamber; and
    a controller configured to selectively control the spark plug to cause combustion in the combustion chamber to apply a torque to start the engine from a stopped condition,
    the controller being further configured to selectively determine whether the operation of the engine will be stopped, and to selectively adjust an operating condition of the engine if the controller determines the engine operation will be stopped, and
    the controller being further configured to selectively increase the rotational speed of the engine to a predetermined rotational speed, if it is determined that the engine operation will be stopped.

3. An internal combustion engine comprising:
    a fuel injector for injecting fuel into a combustion chamber to produce an air-fuel mixture in the combustion chamber;
    a spark plug for igniting the air-fuel mixture to cause combustion in the combustion chamber; and
    a controller configured to selectively control the spark plug to cause combustion in the combustion chamber to apply a torque to start the engine from a stopped condition,
    the controller being further configured to selectively determine whether the operation of the engine will be stopped, and to selectively adjust an operating condition of the engine if the controller determines the engine operation will be stopped, and the controller being further configured to selectively increase the rotational speed of the engine by a predetermined quantity, if it is determined that the engine operation will be stopped.

4. An internal combustion engine comprising:
a fuel injector for injecting fuel into a combustion chamber to produce an air-fuel mixture in the combustion chamber;
a spark plug for igniting the air-fuel mixture to cause combustion in the combustion chamber; and
a controller configured to selectively control the spark plug to cause combustion in the combustion chamber to apply a torque to start the engine from a stopped condition,
the controller being further configured to selectively determine whether the operation of the engine will be stopped, and to selectively adjust an operating condition of the engine if the controller determines the engine operation will be stopped, and
the controller being further configured to selectively increase the quantity of intake air to increase the rotational speed of the engine.

5. An internal combustion engine comprising:
a fuel injector for injecting fuel into a combustion chamber to produce an air-fuel mixture in the combustion chamber;
a spark plug for igniting the air-fuel mixture to cause combustion in the combustion chamber; and
a controller configured to selectively control the spark plug to cause combustion in the combustion chamber to apply a torque to start the engine from a stopped condition,
the controller being further configured to selectively determine whether the operation of the engine will be stopped, and to selectively adjust an operating condition of the engine if the controller determines the engine operation will be stopped, and
the controller being further configured to selectively advance ignition timing to increase the rotational speed of the engine.

6. An internal combustion engine comprising:
a fuel injector for injecting fuel into a combustion chamber to produce an air-fuel mixture in the combustion chamber;
a spark plug for igniting the air-fuel mixture to cause combustion in the combustion chamber;
a controller configured to selectively control the spark plug to cause combustion in the combustion chamber to apply a torque to start the engine from a stopped condition; and
a temperature sensor for determining a temperature relating to the engine or relating to a circumstance of the engine,
the controller being further configured to selectively determine whether the operation of the engine will be stopped, and to selectively adjust an operating condition of the engine if the controller determines the engine operation will be stopped, and
the controller being further configured to selectively adjust the rotational speed of the engine based upon the temperature so determined.

7. The internal combustion engine according to claim 1, further comprising
an accessory operated by an output of the engine,
the controller being configured to selectively adjust the rotational speed of the engine based upon a load imposed by operation of the accessory.

8. The internal combustion engine according to claim 1, further comprising a detector for determining a quantity of rotation of the engine in a period between a time combustion is stopped and a time when the engine stops rotation,
the controller being configured to selectively adjust the rotational speed at a subsequent stop of the engine, based on the quantity of rotation from a previous stop.

9. The internal combustion engine according to claim 1, further comprising
an accessory operated by an output of the engine,
the controller being configured to selectively decrease a load imposed by operation of the accessory.

10. The internal combustion engine according to claim 9, further comprising:
a plurality of accessories,
the controller being configured to selectively stop operation of a predetermined one of the plurality of accessories to increase the rotational speed of the engine.

11. The internal combustion engine according to claim 10, wherein
said plurality of accessories comprises:
a first accessory imposing a first load on the engine when the first accessory is operated by the engine output,
a second accessory imposing a second load on the engine when the second accessory is operated by the engine output, the second load being lower than the first load, and
a third accessory imposing a third load on the engine when the third accessory is operated by the engine output, the third load being lower than the first load,
the controller being configured to selectively stop operation of the second accessory and the third accessory when the first accessory is unable to be stopped.

12. The internal combustion engine according to claim 10, wherein
said plurality of accessories comprises:
a first accessory imposing a first load on the engine when the first accessory is operated by the engine output,
a second accessory imposing a second load lower than the first load on the engine when the second accessory is operated by the engine output, and
a third accessory imposing a third load lower than the first load on the engine when the third accessory is operated by the engine output,
the controller being configured to selectively stop either one of the second accessory and third accessory alternatively, when the first accessory is not operated.

13. The internal combustion engine according to claim 10, wherein
said plurality of accessories comprises:
a first accessory imposing a first load on the engine when the first accessory is operated by the engine output,
a second accessory imposing a second load lower than the first load on the engine when the second accessory is operated by the engine output,
a third accessory imposing a third load lower than the first load on the engine when the third accessory is operated by the engine output, and
a detector for detecting whether the first accessory is being operated or is stopped,
the controller being configured to selectively stop operation of the second accessory and third accessory when the first accessory is operated and to selectively stop operation of either one of the second accessory and third accessory alternatively, when the first accessory is stopped.

14. The internal combustion engine according to claim 12, further comprising a detector for determining a quantity of rotation of the engine in a period between a time when the combustion is stopped and a time when the engine stops rotation, the controller being configured to selectively stop operation of the second accessory and third accessory at a next subsequent stop or subsequent stops of the engine regardless of whether the first accessory is operated or stopped, if the quantity of the rotation in the said period, detected at a previous stop, is lower than a predetermined quantity of rotation.

15. The internal combustion engine according to claim 9, further comprising:

a cylinder block having a cylinder bore formed therein, a cylinder head having an intake passage and an exhaust passage formed therein, the cylinder head being connected to the cylinder block, a piston slidably disposed in the cylinder bore to define a combustion chamber, an intake valve selectively connecting the combustion chamber to the intake passage, and an exhaust valve selectively connecting the combustion chamber to the exhaust passage, the controller being configured to selectively control the spark plug to cause the combustion in the combustion chamber to apply a torque to start the engine from a stopped condition.

16. A direct start internal combustion engine, comprising:

means for injecting fuel directly into the combustion chamber, means for combusting the fuel in the combustion chamber to produce a torque to start the engine from a stopped condition, means for determining whether or not the engine is operating or stopped, and means for increasing rotational speed of the engine, if it is determined that the engine in the operating condition will be stopped.

17. A method of a starting an internal combustion engine, comprising:

injecting fuel directly into the combustion chamber, combusting the fuel in the combustion chamber to produce a torque to start the engine from a stopped condition, determining whether the engine in a rotating condition will be stopped, and increasing rotational speed of the engine, if it is determined that the engine will be stopped.

18. An internal combustion engine controller, comprising:

a controller for controlling combustion in an internal combustion engine to apply a torque to start the engine from a stopped condition, and wherein the controller selectively determines whether the engine operation will be stopped, and selectively increases the rotational speed of the engine before the engine operation will be stopped if the controller determines that the engine operation will be stopped.

19. An internal combustion engine, comprising:

a fuel injector for injecting fuel into a combustion chamber to produce an air-fuel mixture in the combustion chamber, a spark plug for igniting the air-fuel mixture to cause combustion in the combustion chamber, and a controller for controlling the spark plug to cause the combustion in the combustion chamber to apply a torque to start the engine from a stopped condition, and wherein the controller selectively determines whether the engine operation will be stopped, and selectively adjusts the rotational speed of the engine before the engine operation will be stopped if the controller determines the engine operation will be stopped.

* * * * *